US011336523B2

(12) United States Patent
Bell et al.

(10) Patent No.: US 11,336,523 B2
(45) Date of Patent: *May 17, 2022

(54) SYSTEM AND METHOD FOR DATABASE ACCESS USING A HISTORY WALKER

(71) Applicant: ServiceNow, Inc., Santa Clara, CA (US)

(72) Inventors: Nigel Bell, Staines (GB); Cameron Richard, Staines (GB); Jason Occhialini, Loomis, CA (US)

(73) Assignee: ServiceNow, Inc., Santa Clara, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/923,442

(22) Filed: Jul. 8, 2020

(65) Prior Publication Data

US 2020/0409911 A1  Dec. 31, 2020

Related U.S. Application Data

(63) Continuation of application No. 15/862,319, filed on Jan. 4, 2018, now Pat. No. 10,719,485.

(Continued)

(51) Int. Cl.
*G06F 16/30* (2019.01)
*H04L 41/0859* (2022.01)
(Continued)

(52) U.S. Cl.
CPC ........ *H04L 41/0859* (2013.01); *G06F 3/0481* (2013.01); *G06F 3/0482* (2013.01); *G06F 3/0486* (2013.01); *G06F 3/04847* (2013.01); *G06F 9/451* (2018.02); *G06F 9/461* (2013.01); *G06F 9/4881* (2013.01); *G06F 9/5038* (2013.01); *G06F 9/547* (2013.01); *G06F 11/14* (2013.01); *G06F 11/3006* (2013.01); *G06F 11/3452* (2013.01); *G06F 16/1873* (2019.01); *G06F 16/248* (2019.01);
(Continued)

(58) Field of Classification Search
CPC .... G06F 16/27; G06F 16/1873; G06F 16/904; G06F 16/2477; G06F 16/2474; G06F 16/951; G06F 16/2423
USPC ........ 707/609, 687, 705, 769, 790, 813, 821
See application file for complete search history.

(56) References Cited

U.S. PATENT DOCUMENTS 5,978,594 A   11/1999  Bonnell
6,321,229 B1  11/2001  Goldman
(Continued)

*Primary Examiner* — Sana A Al-Hashemi
(74) *Attorney, Agent, or Firm* — Fletcher Yoder PC

(57) ABSTRACT

Systems and methods for a history walker interface to a time-based data structure are disclosed. A time-based data structure may contain information about updates to a set of records that change periodically over time. For example, a set of records that record state transitions of a task item as the task item progresses through its life cycle. An example task item may be represented by a change request or incident report in a help desk software application. The task item begins with an "open" state and may transition through any number of states (e.g., assigned, on-hold, test, customer response requested, etc.) on its way to ultimately being "closed" as completed. A history walker interface may assist application developers when creating applications to indicate how the task item transitioned through its different states throughout its lifecycle.

20 Claims, 9 Drawing Sheets

Related U.S. Application Data

(60) Provisional application No. 62/568,087, filed on Oct. 4, 2017.

(51) Int. Cl.

| | | |
|---|---|---|
| *G06F 9/50* | (2006.01) | |
| *G06F 9/48* | (2006.01) | |
| *G06F 9/46* | (2006.01) | |
| *H04L 67/60* | (2022.01) | |
| *H04L 29/06* | (2006.01) | |
| *G06F 11/14* | (2006.01) | |
| *G06F 40/18* | (2020.01) | |
| *G06F 40/186* | (2020.01) | |
| *G06F 16/18* | (2019.01) | |
| *G06F 16/2458* | (2019.01) | |
| *H04L 41/5006* | (2022.01) | |
| *G06F 16/951* | (2019.01) | |
| *G06F 9/54* | (2006.01) | |
| *H04L 67/55* | (2022.01) | |
| *G06F 9/451* | (2018.01) | |
| *G06F 16/27* | (2019.01) | |
| *G06F 16/2457* | (2019.01) | |
| *G06F 16/242* | (2019.01) | |
| *G06F 16/248* | (2019.01) | |
| *G06F 11/30* | (2006.01) | |
| *G06F 11/34* | (2006.01) | |
| *G06F 3/0486* | (2013.01) | |
| *G06Q 10/06* | (2012.01) | |
| *G06Q 30/06* | (2012.01) | |
| *H04L 41/084* | (2022.01) | |
| *H04L 41/12* | (2022.01) | |
| *H04L 41/22* | (2022.01) | |
| *H04L 43/045* | (2022.01) | |
| *H04L 43/08* | (2022.01) | |
| *G06F 3/04847* | (2022.01) | |
| *G06Q 30/00* | (2012.01) | |
| *G06Q 50/18* | (2012.01) | |
| *G06F 16/904* | (2019.01) | |
| *G06F 3/0482* | (2013.01) | |
| *G06Q 40/00* | (2012.01) | |
| *G06F 3/0481* | (2022.01) | |
| *H04L 41/0803* | (2022.01) | |
| *H04L 41/0893* | (2022.01) | |
| *H04L 43/50* | (2022.01) | |
| *G06F 9/445* | (2018.01) | |
| *G06F 21/53* | (2013.01) | |
| *H04L 41/5009* | (2022.01) | |
| *G06F 3/0484* | (2022.01) | |
| *H04L 41/08* | (2022.01) | |
| *H04L 67/00* | (2022.01) | |
| *H04L 67/12* | (2022.01) | |
| *G06F 21/57* | (2013.01) | |

(52) U.S. Cl.
CPC ...... *G06F 16/2423* (2019.01); *G06F 16/2474* (2019.01); *G06F 16/2477* (2019.01); *G06F 16/24578* (2019.01); *G06F 16/27* (2019.01); *G06F 16/30* (2019.01); *G06F 16/904* (2019.01); *G06F 16/951* (2019.01); *G06F 40/18* (2020.01); *G06F 40/186* (2020.01); *G06Q 10/067* (2013.01); *G06Q 10/0635* (2013.01); *G06Q 10/06314* (2013.01); *G06Q 10/06315* (2013.01); *G06Q 10/06393* (2013.01); *G06Q 30/018* (2013.01); *G06Q 30/0603* (2013.01); *G06Q 30/0635* (2013.01); *G06Q 30/0641* (2013.01); *G06Q 40/12* (2013.12); *G06Q 50/184* (2013.01); *H04L 41/0803* (2013.01); *H04L 41/0843* (2013.01); *H04L 41/0893* (2013.01); *H04L 41/12* (2013.01); *H04L 41/22* (2013.01); *H04L 41/5006* (2013.01); *H04L 43/045* (2013.01); *H04L 43/08* (2013.01); *H04L 43/50* (2013.01); *H04L 63/10* (2013.01); *H04L 63/1433* (2013.01); *H04L 63/20* (2013.01); *H04L 67/26* (2013.01); *H04L 67/32* (2013.01); *G06F 3/0484* (2013.01); *G06F 9/44505* (2013.01); *G06F 21/53* (2013.01); *G06F 21/577* (2013.01); *H04L 41/0879* (2013.01); *H04L 41/5016* (2013.01); *H04L 67/12* (2013.01); *H04L 67/34* (2013.01)

(56) References Cited

U.S. PATENT DOCUMENTS

| | | |
|---|---|---|
| 6,556,659 B1 | 4/2003 | Bowman-Amuah |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,783,744 B2 | 8/2010 | Garg |
| 7,877,783 B1 | 1/2011 | Cline |
| 7,890,802 B2 | 2/2011 | Gerber |
| 7,930,396 B2 | 4/2011 | Trinon |
| 7,933,927 B2 | 4/2011 | Dee |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,082,275 B2 | 12/2011 | De Peuter et al. |
| 8,151,261 B2 | 4/2012 | Sirota |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,457,928 B2 | 6/2013 | Dang |
| 8,478,569 B2 | 7/2013 | Scarpelli |
| 8,554,750 B2 | 10/2013 | Rangaranjan |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,323,801 B2 | 4/2016 | Morozov |
| 9,412,084 B2 | 9/2016 | Kowalski |
| 9,467,344 B2 | 10/2016 | Gere |
| 9,534,903 B2 | 1/2017 | Cline |

(56) References Cited

U.S. PATENT DOCUMENTS

| | | |
|---|---|---|
| 9,535,737 B2 | 1/2017 | Joy |
| 9,557,969 B2 | 1/2017 | Sharma |
| 9,613,070 B2 | 4/2017 | Kumar |
| 9,631,934 B2 | 4/2017 | Cline |
| 9,659,051 B2 | 5/2017 | Hutchins |
| 9,792,387 B2 | 10/2017 | George |
| 9,852,165 B2 | 12/2017 | Morozov |
| 10,002,203 B2 | 6/2018 | George |
| 10,296,303 B2 * | 5/2019 | Laethem ............... G06F 3/0482 |
| 2009/0037386 A1* | 2/2009 | Theobald .............. G06F 40/169 |
| 2009/0037805 A1* | 2/2009 | Theobald .............. G06F 16/113 |
| | | 715/230 |
| 2015/0154169 A1* | 6/2015 | Theobald .............. G06F 40/169 |
| | | 715/230 |
| 2017/0329579 A1* | 11/2017 | Laethem ............... G06F 3/0482 |
| 2018/0225097 A1* | 8/2018 | Laethem ............... G06F 3/0486 |
| 2019/0102386 A1* | 4/2019 | Bell .................... H04L 41/5006 |
| 2019/0332359 A1* | 10/2019 | Laethem .................. G06F 8/34 |

* cited by examiner

SYSTEM AND METHOD FOR DATABASE ACCESS USING A HISTORY WALKER

RELATED CASES

This is a continuation of U.S. patent application Ser. No. 15/862,319, filed on Jan. 4, 2018, which claims priority to and benefit of U.S. Provisional Patent Application Ser. 62/568,087, filed Oct. 4, 2017, entitled "Platform Computing Environment and Functionality thereof," by Amradkar, et. al, for all applicable purposes, including a right of priority, the contents of which are incorporated by reference herein, in their entirety.

TECHNICAL FIELD

Embodiments described herein generally relate to enterprise computing and, in particular, to providing a history walker interface to access a database table. A history walker interface provides current field values for a given record and includes information describing changes to records. Database tables that include information that changes over time (e.g., records tracking changes to work items that are subject to a service level agreement (SLA)) may be used by applications that benefit from this enhanced access method. For example, any application that may be subject to audit, or an application saving time-based transactions records in a database.

BACKGROUND

Cloud computing relates to the sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

Within the context of cloud computing solutions, data access and presentation methods have become an important tool for users and application developers when creating enterprise applications. As used herein, a time-based data structure refers to a data structure (e.g., table or other data store) that has records containing information that changes over a time period. That is, information in logically adjacent records may represent a transaction history representative of the life-cycle of something that persists for a time period being maintained in a database (e.g., incident report, purchase request, travel itinerary). The changes over time may be recorded in a single record or multiple different records of the time-based data structure. In a simple case, records are stored logically adjacent to each other and each record (e.g., row) contains information in each field (e.g., column) even if that value has not changed. In other cases, records may contain only changed values and represent a delta (i.e., change record) to the immediately previous record. In some cases, records may contain a key value (or set of values) that may be used to identify records that are related to each other. For example, a data structure may contain a field called "update" which holds a value reflecting an update number that may be incremented when any update is made relative to a related set of records in the data structure. The disclosed techniques for interfacing to time-based information in data repositories represent improvements to address these and other issues.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
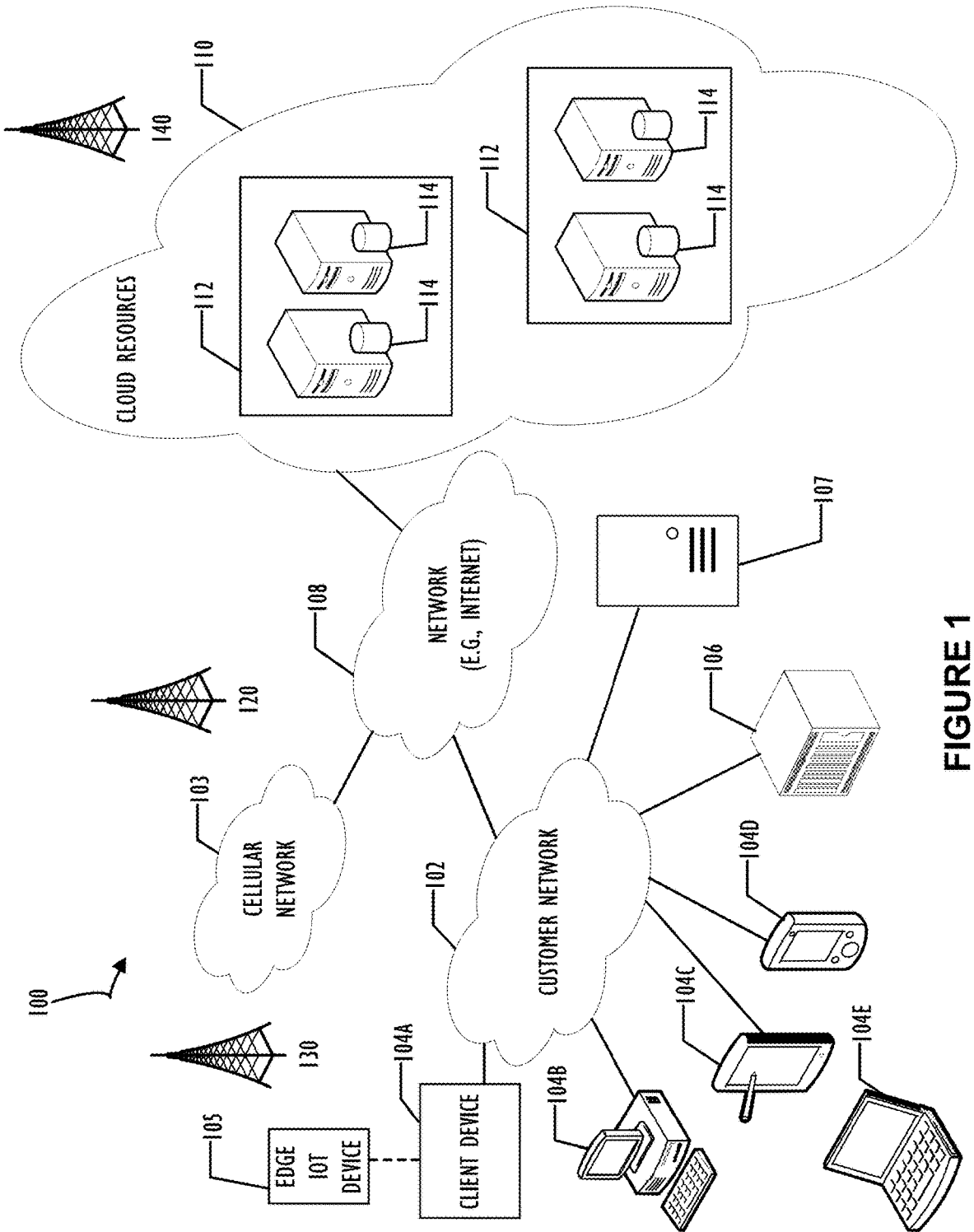
FIG. 1 illustrates a block diagram of an embodiment of a cloud computing infrastructure 100 where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the terms "application" and "function" refer to one or more computing modules, programs, processes, workloads, threads and/or a set of computing instructions executed by a computing system. Example embodiments of applications and functions include software modules, software objects, software instances and/or other types of executable code.

As disclosed herein, a history walker interface to a time-based data structure refers to an interface that retrieves records from one or more tables (or other data storage structures) and includes information describing how or why one or more fields have changed values. The disclosed history walker interface allows access to an existing logical record of a time-based data structure and permits "walking" forward and backward through its historical updates while identifying which fields have changed. The history walker interface may: control (and honor) record and field level security when walking through historical data; control if the history or audit tables are used to retrieve historical updates to the record; turn off default behavior that identifies which fields have changed for an update and provide enhanced behavior; walk to a specific update number; walk forward to the next chronological update; and walk backward to the previous chronological update. In some embodiments, the history walker interface may be provided as an application program interface (API). In an example application, explained further below, the history walker API may be used for advanced service level agreement (SLA) "administrator level functions" that are supported by an SLA application (e.g., an SLA timeline). In one embodiment, the history walker will provide a way to walk through information retrieved from a database using an existing glide record (explained below). If a record has a particular update number, the history walker API may be configured to walk to a previous update number while preserving the changes in each glide element and have an ability to test each element to determine which elements have changed. SLA administrator functions can include a "Reset" condition that allows customers to generate a new task SLA when a field changes (e.g., assignment group or a date/time field). In this example Reset condition, a new task SLA may be generated because the fields that have changed may cause a new clock timer to be initiated and not accrue the time spent prior to that change against the new task SLA. For example, if a priority one incident was opened against the wrong assignment group and it took 10 minutes to move the incident to the correct group, the incorrect group is not "penalized" the 10 minute delay and starts with zero elapsed time.

Databases may store information for their associated tables in a number of ways. In general, the physical storage of updates may be a design consideration for performance of the overall database and may depend on the type of data being stored in the database. In some cases, a data structure may include values for every element (e.g., column) in every record (e.g., row). In other implementations, a data structure may only store changed values in subsequent records as a delta against the previous record. Delta storage may be useful if there are many elements in each record and very few of the elements are expected to change for any given update. Information may be stored in a single table or in multiple tables that reference each other through pointers or key values. Additionally, some databases have internally implemented audit mechanisms to track changes to field values and the addition (or removal) of records. Audit mechanisms are used to determine who, what, and possibly why data fields within the database have changed. Details of database implementation (at the physical storage level) are beyond the scope of this disclosure and are not discussed further. In this disclosure, the database will be primarily considered at a higher level and return a logical view of a record and its elements (e.g., a glide record) regardless of how the data is actually stored at the physical level. The disclosed history walker interface may be designed to interface with any number of database implementations. Further information about a history walker interface to a database and an SLA timeline application configured to use a history walker interface is discussed below with reference to FIGS. 3-8.

FIG. 1 illustrates a block diagram of an embodiment of a cloud computing infrastructure 100 where embodiments of the present disclosure may operate. Cloud computing infrastructure 100 comprises a customer network 102, network 108, and a cloud resources platform/network 110. In one embodiment, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks, Bluetooth®). Wi-Fi is a registered trademark of the Wi-Fi Alliance. Bluetooth is a registered trademark of Bluetooth Special Interest Group. In another embodiment, customer network 102 represents an enterprise network that could include or be communicatively coupled to one or more local area networks (LANs), virtual networks, data centers, and/or other remote networks (e.g., 108, 112). As shown in FIG. 1, customer network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that customer network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between customer network 102 and other networks such as network 108 and cloud resources platform/network 110. Local compute resource 106 may also facilitate communication between other external applications, data sources, and services, and customer network 102. FIG. 1 also illustrates that customer network 102 may be connected to a computer configured to execute a management, instrumentation, and discovery (MID) server 107. For example, MID server 107 may be a Java application that runs as a Windows service or UNIX daemon. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices, such as wireless access points and routers (e.g., local compute resource 106). In addition, the mobile devices may interact with other mobile devices or with non-mobile devices such as desktop computer 104B and various types of client devices 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WANs), the Internet, and/or other remote networks, in order to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via customer network 102 and network 108. The cloud resources platform/network 110 acts as a platform that provides additional computing resources to the client devices 104A-E and/or customer network 102. For example, by utilizing the cloud resources platform/network 110, users of client devices 104A-E may be able to build and execute applications, such as automated processes for various enterprise, IT, and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to, a web server instance (e.g., a unitary Apache installation), an application server instance (e.g., unitary Java Virtual Machine), and/or a database server instance (e.g., a unitary MySQL catalog).

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114.

In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud resources platform/network 110, and customer-driven upgrade schedules. An example of implementing a customer instance within a multi-instance cloud architecture will be discussed in more detail below when describing FIG. 2.

Figure 2:
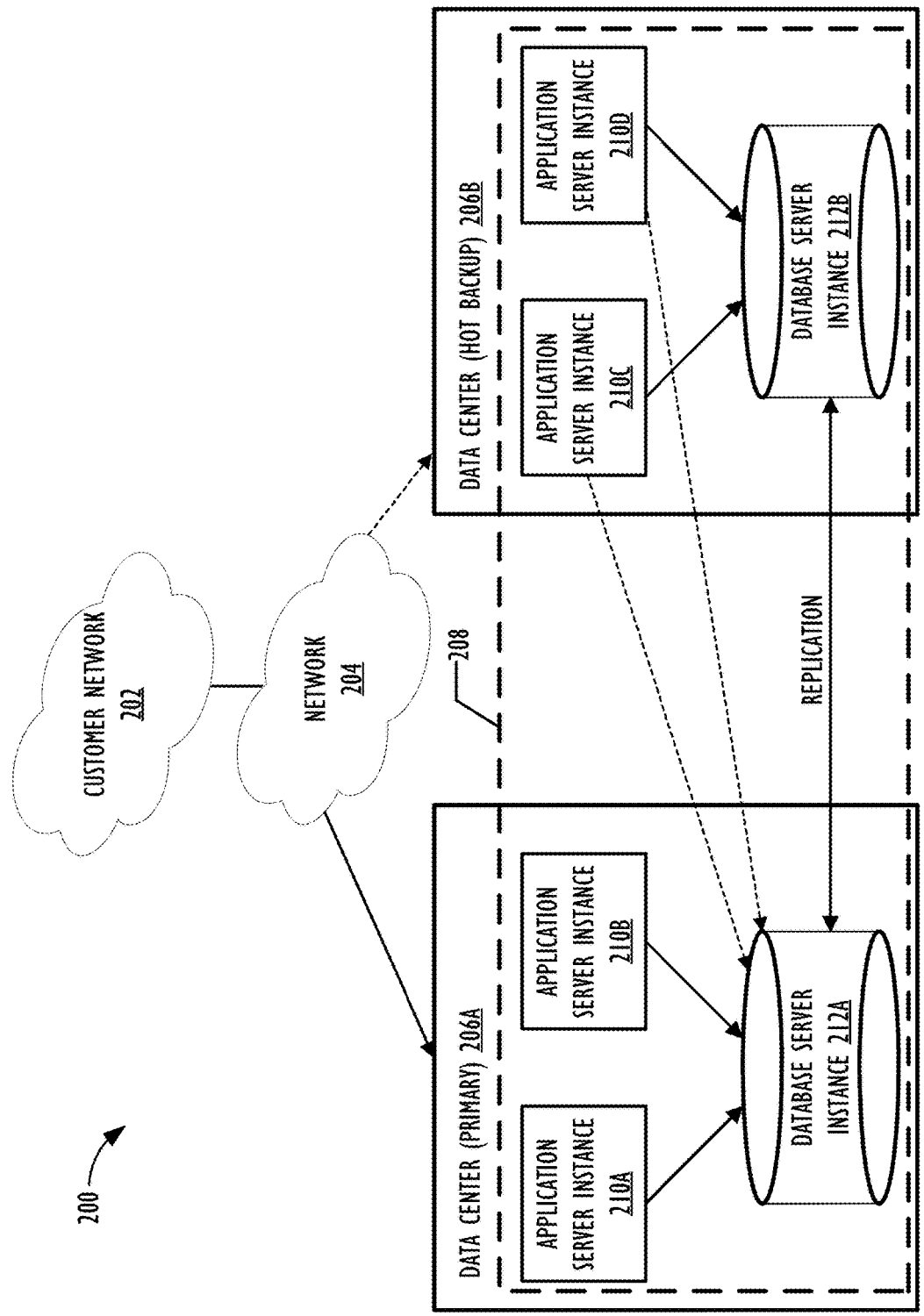
FIG. 2 illustrates a block diagram of an embodiment of a multi-instance cloud architecture 200 where embodiments of the present disclosure may operate.

FIG. 2 illustrates a block diagram of an embodiment of a multi-instance cloud architecture 200 where embodiments of the present disclosure may operate. FIG. 2 illustrates that the multi-instance cloud architecture 200 includes a customer network 202 that connects to two data centers 206A and 206B via network 204. Customer network 202 and network 204 may be substantially similar to customer network 102 and network 108 as described in FIG. 1, respectively. Data centers 206A and 206B can correspond to FIG. 1's data centers 112 located within cloud resources platform/network 110. Using FIG. 2 as an example, a customer instance 208 is composed of four dedicated application server instances 210A-210D and two dedicated database server instances 212A and 212B Stated another way, the application server instances 210A-210D and database server instances 212A and 212B are not shared with other customer instances 208. Other embodiments of the multi-instance cloud architecture 200 could include other types of dedicated server instances, such as a web server instance. For example, the customer instance 208 could include the four dedicated application server instances 210A-210D, two dedicated database server instances 212A and 212B, and four dedicated web server instances (not shown in FIG. 2).

To facilitate higher availability of the customer instance 208, application server instances 210A-210D and database server instances 212A and 212B are shown to be allocated to two different data centers 206A and 206B, where one of data centers 206A and 206B may act as a backup data center. In reference to FIG. 2, data center 206A acts as a primary data center that includes a primary pair of application server instances 210A and 210B and primary database server instance 212A for customer instance 208, and data center 206B acts as a secondary data center to back up primary data center 206A for a customer instance 208. To back up primary data center 206A for customer instance 208, secondary data center 206B includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master MySQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for the customer instance 208 to be diverted to the second data center 206B during a failure and/or maintenance scenario. Using FIG. 2 as an example, if application server instances 210A and 210B and/or primary data server instance 212A fails and/or is under maintenance, data traffic for customer instances 208 can be diverted to secondary application server instances 210C and 210D and secondary database server instance 212B for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210A-210D and database server instances 212A-212B can be combined into a single server instance. The use and discussion of FIGS. 1 and 2 are only examples to facilitate ease of description and explanation.

Figure 3:
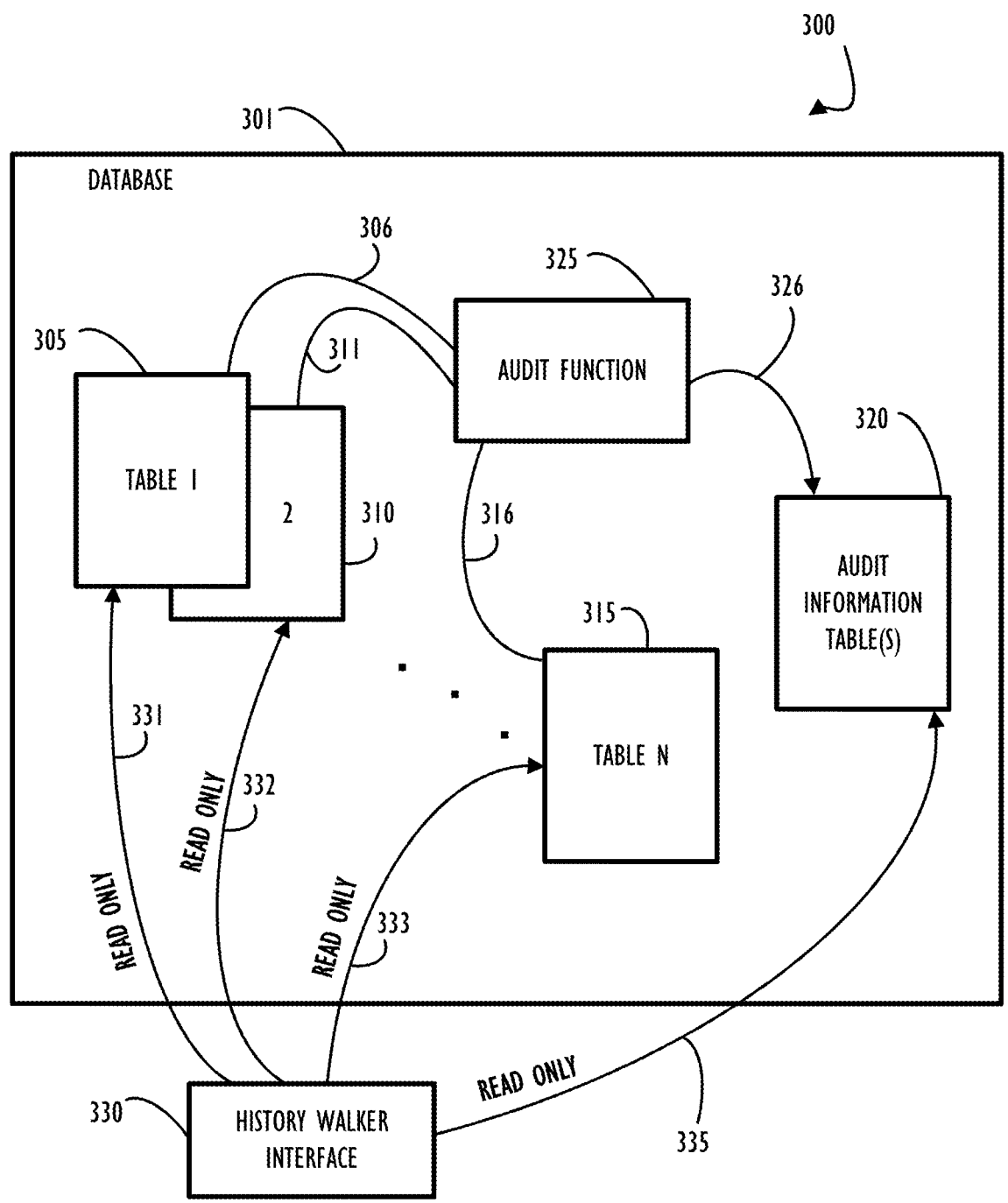
FIG. 3 illustrates a block diagram 300 illustrating a database having a plurality of tables and including an internal audit control function and related audit information tables.

Referring now to FIG. 3, block diagram 300 represents a possible interaction flow for a history walker interface to database 301 according to one or more disclosed embodiments. Block diagram 300 includes tables 1-N (305, 310, and 315), audit function 325, and audit information tables 320 that, in this example, are internal to database 301. History walker interface 330 is external to database 301 and has read-only access to information tables within database 301. In some cases, a history walker interface may be internal to a database (e.g., provided by native database access controls) and may have read/write access, however, for this example embodiment read-only access is adequate. Tables 1, 2 . . . N (305, 310, and 315) represent data tables and may store information at a physical level using any of the methods described above (e.g., delta, full, etc.). Audit function 325 monitors updates to table 1 as illustrated by line 306, updates to table 2 as illustrated by line 311, and updates to table N as illustrated by line 316. Audit function 325 stores (shown by line 326) its audit information in one or more audit tables 320. Access by audit function 325 to audit tables 320 may be write-only, or read-write, depending on implementation and security requirements. In general, audit tables within a database (such as audit tables 320) have strict access controls because they store sensitive information that should not be altered by functions other than an official audit function. In this example, history walker interface 330 is allowed read-only access to tables 1-N as shown by lines 331, 332, and 333. Additionally, history walker interface 330 is configured with read-only access (line 335) to audit information tables 320. In some embodiments, history walker interface 330 will only access audit information tables 320 when instructed to utilize that information and may attempt to first determine all element values and required change information by interrogating only standard information tables (e.g., tables 1-N, 305, 310, and 315). In other embodiments, history walker interface 330 will access some form of audit data when walking a record to an update. History walker interface 330 may access audit data in one or both of the following ways. First, historical data for a record may be accessed by going directly to the Audit ("sys_audit") table. This table contains details of modifications to any field on any record type that has auditing enabled. As such, this may be a very large table which is accessed frequently by an instance to record changes and in some cases read data from it. Second, an interface (e.g., a history set API) may be used to access audit data. This interface may be configured to interrogate its own history tables first for the historical data for a record (e.g., may act like a cache). If the data is available on these history tables then it will be read from there. If the data is unavailable, then the "sys_audit" table will be queried and the data extracted to populate the history tables of the interface so it is available the next time that data is needed. Obviously, this history set API may provide performance improvements over accessing the "sys_audit" table and may be beneficial in some embodiments. As in a cache, data may be rotated in an out of the history set tables on a regular basis and may be tuned as needed for performance.

Audit functions within database 301 may be implemented in different ways. In some cases, audit controls are integrated into "write" functions such that any data stored (e.g., via "update" function) in a table is concurrently tracked in the audit tables (e.g., audit information tables 320) of the database. In other cases, changes to data may be detected by monitors to implement audit controls. In most cases, audit controls of a database are intended to capture comprehensive information regarding database activities and may be implemented using different techniques.

As mentioned above, some embodiments of a history walker interface to a database may be implemented using a "glide record." As used herein, a glide record provides a logical view into a specific record of information stored in one or more tables of a database. In some embodiments, the glide record may be configured to include both field values and information describing how or why any field with a changed value (relative to the chronologically previous record) was changed. For example, if a view into Update-10 for an incident report is requested in a glide record, that glide record will contain values of all field values relevant to Update-10, AND information describing how or why any field values differ from that generated in response to Update-9. In this example, update numbers are expected to update sequentially so Update-10 would be the immediately subsequent update to Update-9.

The disclosed history walker interface to information in a database may assist application developers with implementing a variety of applications. For example, applications that deal with time-based data structures, discussed above, may benefit. One example application is an SLA application that presents an SLA timeline for a task SLA item subject to an SLA (See FIG. 5). An SLA may represent an agreement between a service provider and a customer of that service to address issues within a specific time frame. An SLA may require that issues set to a high priority are corrected in a short time period (e.g., 1 hour for priority 1 incident reports). To address incident reports, many enterprises utilize help desk software. In general, help desk software collects information from users experiencing an issue, assigns the issue (task item associated with incident report) to a working team, and tracks the issue until resolution. During its lifecycle, information with a particular incident will change over time. An SLA timeline application presents a visual depiction of the lifecycle for one or more incidents and provides indications of conformance or non-conformance with an associated SLA. Further details of SLAs and applications working with SLAs are described in U.S. Provisional Patent Application Ser. No. 62/501,643, entitled "Timeline Zoom and Service Level Agreement Validation," by Jason Occhialini, which is incorporated by reference herein in its entirety for all purposes.

The disclosed history walker interface may assist the example SLA timeline application by allowing a request for a particular status (e.g., by update number) and creating a view of that update in conjunction with changes in that update relative to the immediately preceding update. For example, a request for Update-5 will return all field values for Update-5 and information describing any values that have changed from Update-4. If, in this example, a priority field changed from Update-4 to Update-5, the requested glide record may be useful to describe that transition on a corresponding SLA timeline view. The augmented information in a history walker glide record may reduce either the programming overhead or the run-time performance requirements (or both) for this example SLA timeline application. In another example use, the history walker interface may be used to assist in "recalculating" an SLA. Recalculating may be required for technical or corporate reasons. In one case, missed update processing may have been caused by some sort of system error such as a lock failure or race condition between two tasks. In this case, a "repair" function may be used to properly adjust for the missed update processing. A repair function may also be considered an SLA "administrator function" along with the "reset" condition discussed above. In general, the repair function corrects for calculation issues. In another example, SLA definitions (and contractual requirements) may be changed after some incidents, or other task items, are already in progress (or have completed). One such case may be a service level contract adjustment from one year to the next where the contract is not made active prior to the start of the year for which the agreement applies (e.g., signed in February and SLAs are applicable for the calendar year). In this case, once new SLA definitions have become active for any new task SLA items, they may have to be retroactively applied to historical task SLA items. This may be required to determine an overall compliance for the entire contract period (e.g., January to December). An application configured to accurately apply SLAs retroactively may benefit from the disclosed history walker interface by using the history walker interface to step through the completed (and in-progress) task SLA items for determining compliance and calculating any additionally required metrics.

Figure 4:
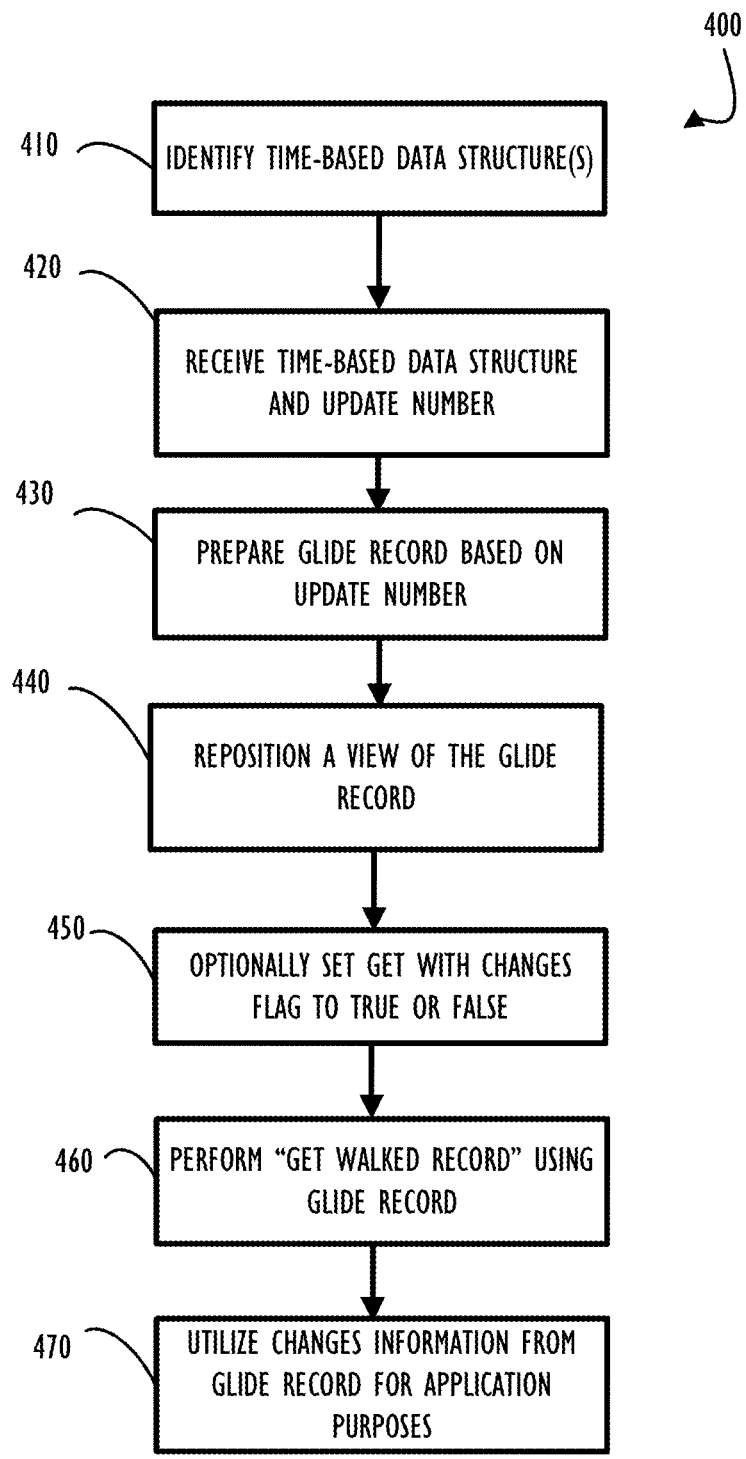
FIG. 4 illustrates operation 400 representing one possible interaction between an application and one or more time-based data structures using a history walker interface according to one or more disclosed embodiments.

Referring now to FIG. 4, operation 400 illustrates one possible interaction between an application and one or more time-based data structures using a history walker interface according to one or more disclosed embodiments. Beginning at block 410, one or more time-based data structures are identified by an application program. For example, an application program may identify one or more time-based data structures for which historical change information may be desired. At block 420, an indication of both a time-based data structure and an update number are received for processing (e.g., at a history walker interface from an application program). Block 430 indicates that a glide record (e.g., view into a data structure) may be prepared based on the update number as, for example, identified by an application program. Block 440 indicates that, in this embodiment, at least three methods to "reposition a view" may be supported by the history walker interface. A "walk to" method, a "walk forward" method, and a "walk backward" method. The walk to method walks to the view (e.g., glide record) to the specified update number. This can be higher or lower than whatever the current walked to update. The walk forward method walks one update number forward from the current walked to record. The walk backward method walks one update number backward from the current walked to record. While moving forward or backward, the glide record may be populated with information to support information identifying how/why information has changed between updates. This information may be maintained in the glide record and made available to the application program as requested. Once the view (e.g. glide record) is positioned as desired, a call to a "get walked record" may be used to retrieve information from that record. Block 450 indicates that a flag (e.g., "get with changes" flag) may be set to true to indicate that the get walked record method (block 460) should retrieve both the information from the record and the changes information made available by the history walker interface. In operation, this embodiment, simply positions the glide record using the described positioning methods and then retrieves the data either with or without "changes" information based on how the get with changes flag is set. Using these methods the application program may move forward and backward across updates to the time-based data structure and obtain a picture of how elements of the update records have been altered over time. For example, an SLA record may be stepped through to determine compliance (or gather other information) of a task SLA item with an associated SLA definition. In this case, the changes information may be obtained, at least in part, by accessing audit information tables (e.g., 320 of FIG. 3). As explained above, some databases maintain audit table information automatically to track changes to data stored therein. The disclosed history walker interface may be configured to determine changes information by comparing adjacent records of a time-based data structure, using internally cached audit information, querying audit information tables, or a combination thereof. Block 470 illustrates that the application program may obtain and use information from a glide record, including the changes information prepared by the history walker interface, as needed for application purposes. One example SLA timeline application that may benefit from the disclosed history walker interface is discussed next with reference to FIGS. 5-8.

Figure 5:
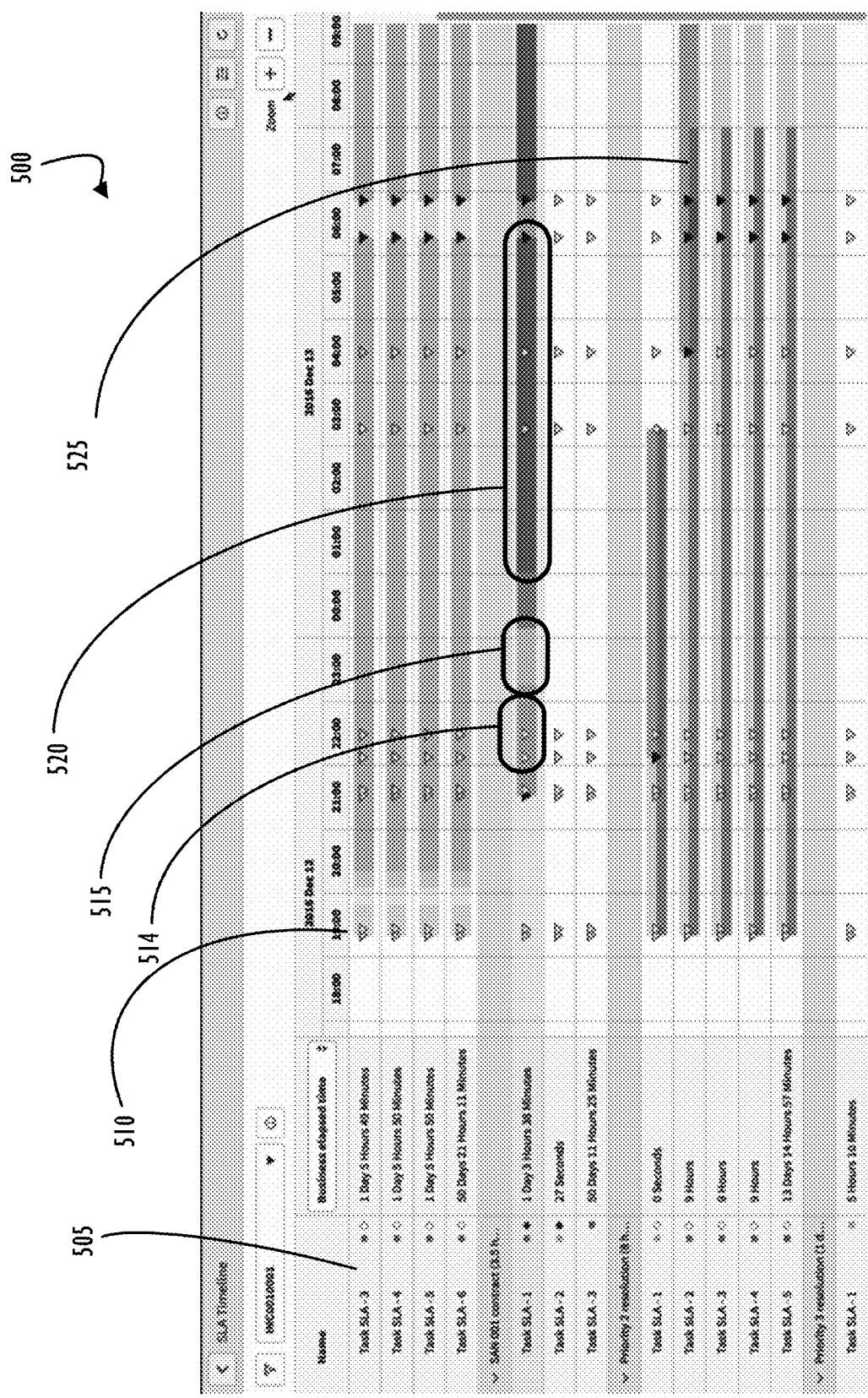
FIG. 5 illustrates a screen shot 500 of a service level agreement (SLA) timeline view containing data prepared by an SLA timeline application that may be configured to use a history walker interface according to one or more disclosed embodiments.
Figure 6:
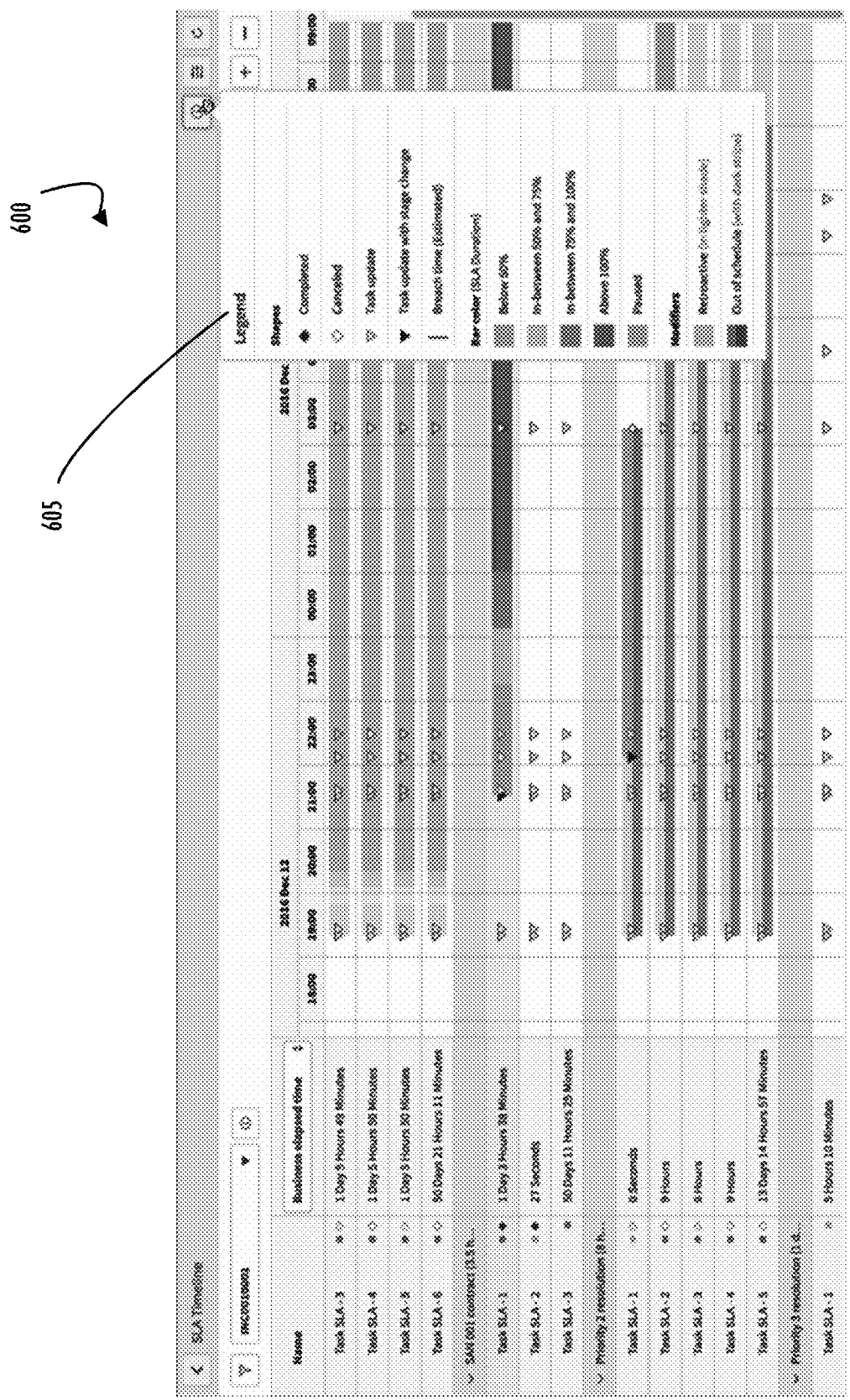
FIG. 6 illustrates a screen shot 600 including one possible legend 605 explaining elements and icons shown in screen shot 500 according to one or more disclosed embodiments.
Figure 7:
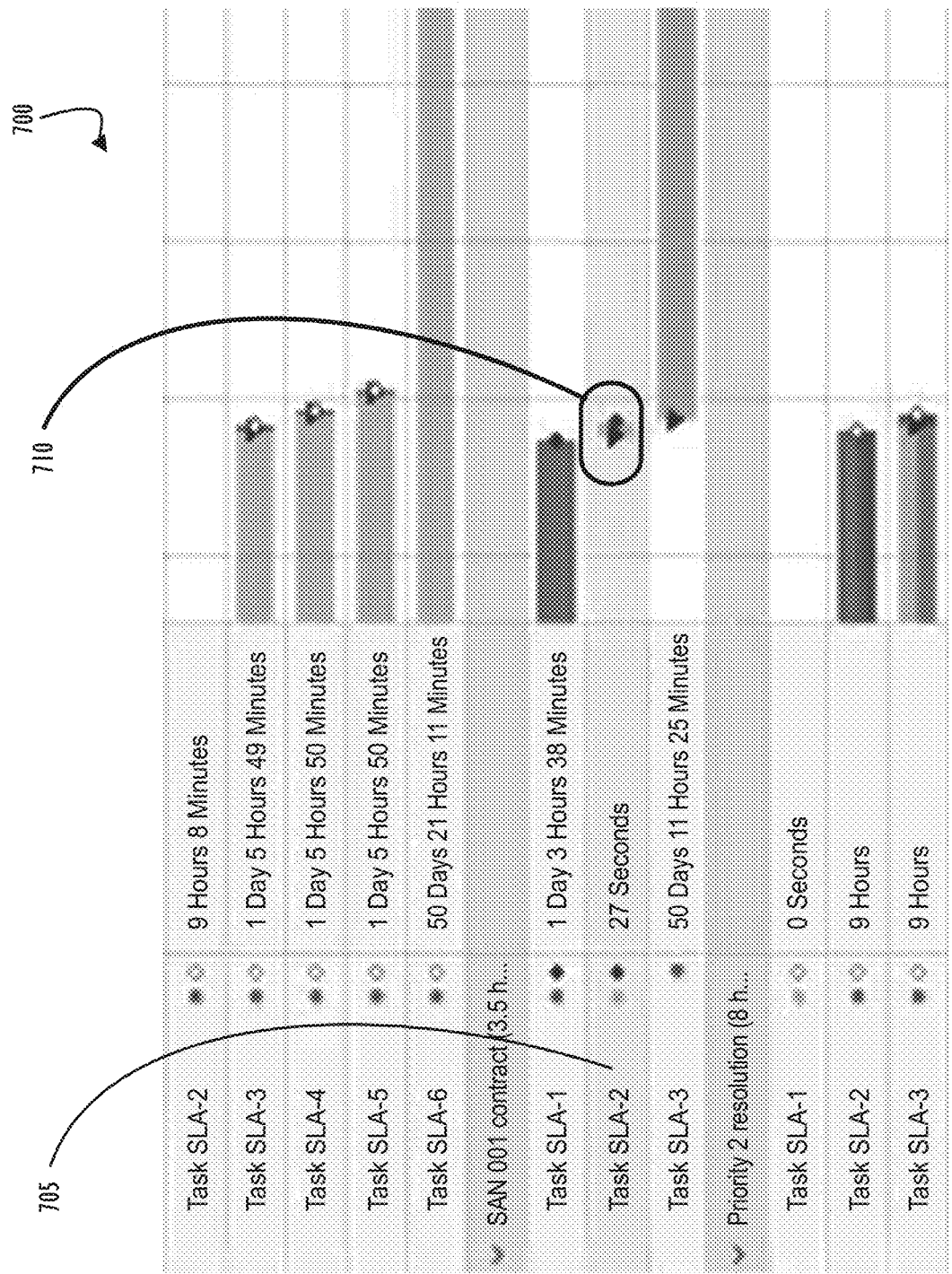
FIG. 7 illustrates a zoomed portion 700 of screen shot 500 to illustrate a grouping of closely occurring events 710 within a timeline display according to one or more disclosed embodiments.

Referring now to FIGS. 5-7, FIG. 5 illustrates a screen shot 500 for multiple task SLAs, each associated with an SLA definition, and providing a visualization with indications of conformance to the associated SLA, the visualization further including indications of state changes with respect to the SLA, according to one or more disclosed embodiments. In general, a customer creates SLA definitions which are for a specific task type (e.g., incident). Each SLA definition has a start condition to determine when this SLA definition should be triggered against the specified task types (e.g., Priority is 1). Each time a task is created or updated the SLA definitions defined for the associated task type may be evaluated to determine if the start condition matches. When a start condition matches a new task SLA record may be created based on the SLA definition and linked to the task (e.g., incident) that triggered it.

Returning to FIG. 5, element 505 represents a task SLA item. Element 510 represents an icon indicating a state change or other discrete event associated with the task SLA item. Element 515 represents a color coded segment of the horizontal timeline. Color coding may be used to represent an elapsed time and compliance with SLA requirements. For example, a first color (e.g., green as indicated by element 514) may be used to represent that the amount of time used to resolve the problem was less than 50% of the allowable time, a second color (e.g., yellow) may be used to represent that the amount of time used was between 50% and 75%, a third color (e.g., orange) may be used to represent the amount of time used was between 75% and 100%, and a fourth color (e.g., red as indicated by element 520) may be used to represent that the SLA was out of compliance and more than 100% of the allowable time had elapsed. Additionally, a modifier as illustrated by element 525 may be presented by darkening a lower half of the timeline bar to indicate areas related to a scheduling aspect of the SLA. For example, some SLAs may only be active during regular work hours such that they are considered "out of schedule" during non-working hours, while others may be "in-schedule" twenty four hours a day every day. Each of the state transitions of a task SLA item as shown in the SLA timeline represent information that may be obtained using a history walker interface as disclosed herein. For example, each of the state transitions of a task SLA item (e.g., changes through lifecycle) may be stored as sequential updates to a time-based data structure containing information about the task SLA item associated with the SLA definition. An application configured to work with a history walker interface may request information for a particular update related to color coded section 515. Next, the history walker may be instructed to walk backward through one or more updates to gather information for one or more updates in preceding area 514. Alternatively, or in addition, the history walker may be instructed to walk forward through one or more updates and gather information represented by area 520 which is subsequent in time to area 515. Importantly, a history walker interface may be useful to an application configured to generate the timeline view for each task SLA item 505 as shown in screenshot 500. That is, the history walker interface could start at a first update and walk forward providing the application all required information to construct the timeline view of screen shot 500. FIG. 6 illustrates a screen shot 600 including one possible legend 605 explaining elements and icons shown in screen shot 500 according to one or more disclosed embodiments. FIG. 7 illustrates a zoomed portion 700 of screen shot 500 to illustrate a grouping of closely occurring events 710 for task SLA-2 element 705 within a timeline display according to one or more disclosed embodiments.

Figure 8:
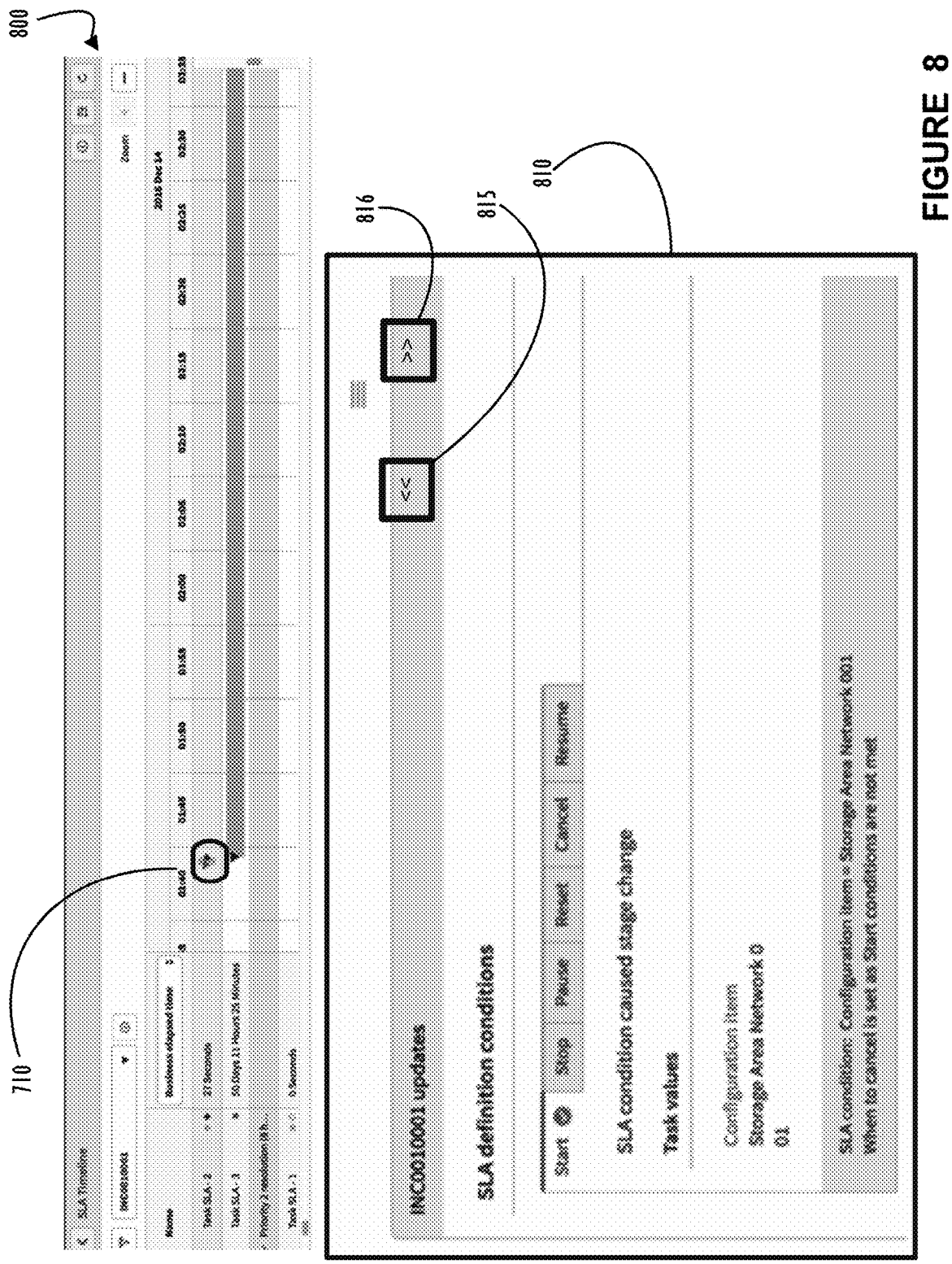
FIG. 8 illustrates a screen shot 800 including a popup dialog 810 designed to convey information and allow detailed navigation of closely occurring events 810 and provide information about changes to elements over time (e.g., using history walker interface) within a timeline display according to one or more disclosed embodiments.

FIG. 8 illustrates a screen shot 800 including a popup dialog 810 designed to convey information and allow detailed navigation of closely occurring events 710 within a timeline display according to one or more disclosed embodiments. Selection buttons 815 and 816 may be used to step backward (815) or forward (816). To step forward/backward, a history walker interface could be used to step through SLA conditions (e.g., updates) causing a state change and provide information to inform a user as to why or how the conditions caused the state change. This method of presentation may be useful to obtain information about closely occurring events. Events that are caused by automated systems may occur in very close time proximity to one another and thus may be more easily viewed using the information provided in popup dialog 810.

Figure 9:
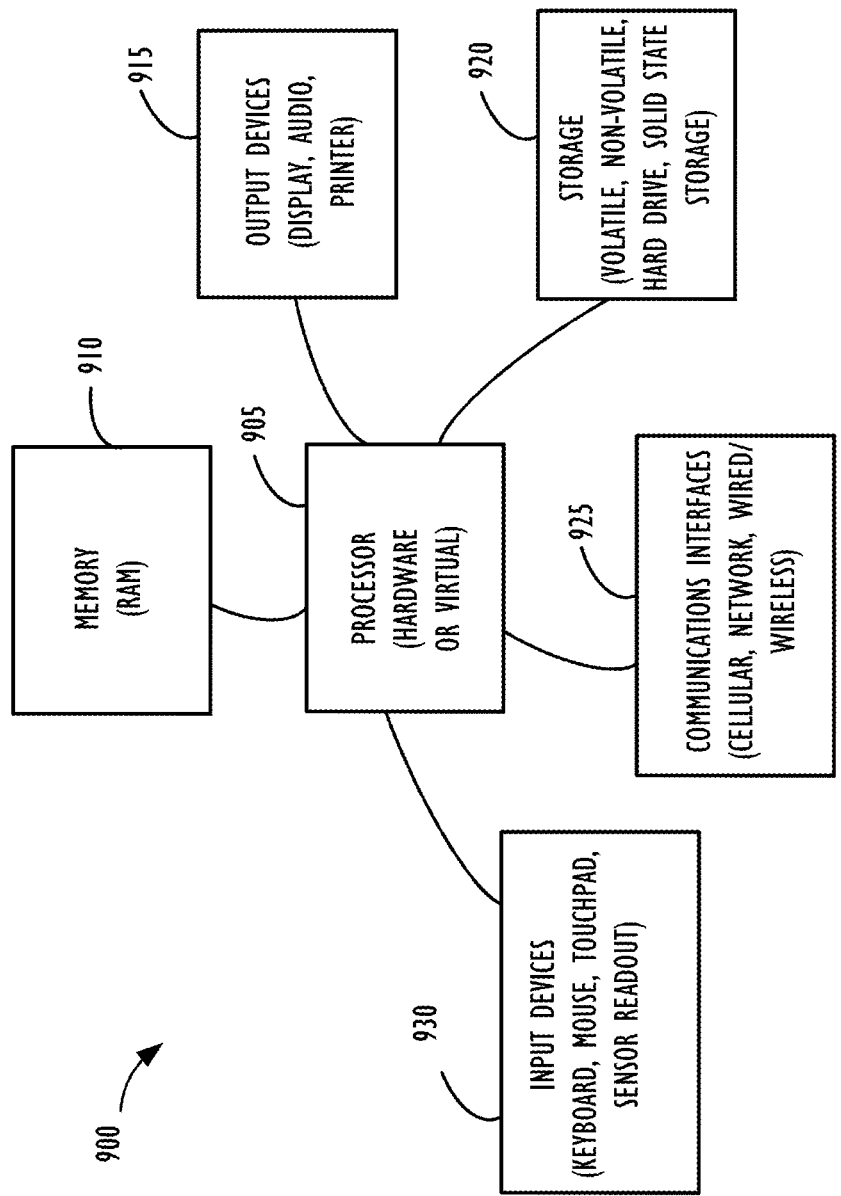
FIG. 9 illustrates a high-level block diagram 900 of a processing device (computing system) that may be used to implement one or more disclosed embodiments.

FIG. 9 illustrates a high-level block diagram 900 of a processing device (computing system) that may be used to implement one or more disclosed embodiments (e.g., service provider cloud infrastructure 110, client devices 104A-104E, server instances 114, data centers 206A-206B, etc.). For example, computing device 900, illustrated in FIG. 9, could represent a client device or a physical server device and could include either hardware or virtual processor(s) depending on the level of abstraction of the computing device. In some instances (without abstraction) computing device 900 and its elements as shown in FIG. 9 each relate to physical hardware and in some instances one, more, or all of the elements could be implemented using emulators or virtual machines as levels of abstraction. In any case, no matter how many levels of abstraction away from the physical hardware, computing device 900 at its lowest level may be implemented on physical hardware. As also shown in FIG. 9, computing device 900 may include one or more input devices 930, such as a keyboard, mouse, touchpad, or sensor readout (e.g., biometric scanner) and one or more output devices 915, such as displays, speakers for audio, or printers. Some devices may be configured as input/output devices also (e.g., a network interface or touchscreen display). Computing device 900 may also include communications interfaces 925, such as a network communication unit that could include a wired communication component and/or a wireless communications component, which may be communicatively coupled to processor 905. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 9, processing device 900 includes a processing element, such as processor 905, that contains one or more hardware processors, where each hardware processor may have a single or multiple processor cores. In one embodiment, the processor 905 may include at least one shared cache that stores data (e.g., computing instructions) that are utilized by one or more other components of processor 905. For example, the shared cache may be a locally cached data stored in a memory for faster access by components of the processing elements that make up processor 905. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) microprocessor. Although not illustrated in FIG. 9, the processing elements that make up processor 905 may also include one or more other types of hardware processing components, such as graphics processing units (GPUs), application specific integrated circuits (ASICs), field-programmable gate arrays (FPGAs), and/or digital signal processors (DSPs).

FIG. 9 illustrates that memory 910 may be operatively and communicatively coupled to processor 905. Memory 910 may be a non-transitory medium configured to store various types of data. For example, memory 910 may include one or more storage devices 920 that comprise a non-volatile storage device and/or volatile memory. Volatile memory, such as random access memory (RAM), can be any suitable non-permanent storage device. The non-volatile storage devices 920 can include one or more disk drives, optical drives, solid-state drives (SSDs), tap drives, flash memory, read-only memory (ROM), and/or any other type memory designed to maintain data for a duration time after a power loss or shut down operation. In certain instances, the non-volatile storage devices 920 may be used to store overflow data if allocated RAM is not large enough to hold all working data. The non-volatile storage devices 920 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 905. In one embodiment, the compiling process of the software program may transform program code written in a programming language to another computer language such that the processor 905 is able to execute the programming code. For example, the compiling process of the software program may generate an executable program that provides encoded instructions (e.g., machine code instructions) for processor 905 to accomplish specific, non-generic, particular computing functions.

After the compiling process, the encoded instructions may then be loaded as computer executable instructions or process steps to processor 905 from storage 920, from memory 910, and/or embedded within processor 905 (e.g., via a cache or on-board ROM). Processor 905 may be configured to execute the stored instructions or process steps in order to perform instructions or process steps to transform the computing device into a non-generic, particular, specially programmed machine or apparatus. Stored data, e.g., data stored by a storage device 920, may be accessed by processor 905 during the execution of computer executable instructions or process steps to instruct one or more components within the computing device 900.

A user interface (e.g., output devices 915 and input devices 930) can include a display, positional input device (such as a mouse, touchpad, touchscreen, or the like), keyboard, or other forms of user input and output devices. The user interface components may be communicatively coupled to processor 905. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 900 may comprise other components well known in the art, such as sensors, powers sources, and/or analog-to-digital converters, not explicitly shown in FIG. 9.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

The subject matter of this disclosure may be applicable to numerous use cases that have not been explicitly discussed here but are contemplated by this disclosure. For example, the provisional applications filed by the same applicant on May 4, 2017 and May 5, 2017 entitled "Service Platform and use thereof" have further examples. The U.S. Provisional applications given filing Ser. Nos. 62/501,646; 62/501,657; 62/502,258; 62/502,308; and 62/502,244 are hereby incorporated by reference.

What is claimed is:

1. A system, comprising:
one or more hardware processors; and
a non-transitory memory storing instructions that, when executed by the one or more hardware processors, causes the one or more hardware processors to perform actions comprising:
providing a first representation of a graphical user interface (GUI) to a client device, wherein the first representation of the GUI displays a timeline for each item of one or more items associated with a time-based data structure;
requesting update information associated with a portion of a particular timeline from a history walker interface configured to retrieve the update information from the time-based data structure, wherein the update information is related to an update to a particular item of the one or more items, and wherein the update is positioned along the particular timeline;
receiving the update information from the history walker interface, wherein the update information is indicative of one or more additional updates that precede the update, or proceed the update, or both; and
providing a second representation of the GUI to the client device, wherein the second representation of the GUI comprises the update and the one or more additional updates positioned along the particular timeline.

2. A method, comprising:
providing a first representation of a graphical user interface (GUI) to a client device, wherein the first representation of the GUI displays a timeline for each item of one or more items associated with a time-based data structure;
requesting update information associated with a portion of a particular timeline from a history walker interface configured to retrieve the update information from the time-based data structure, wherein the update information is related to an update to a particular item of the one or more items, and wherein the update is positioned along the particular timeline;
receiving the update information from the history walker interface, wherein the update information is indicative of one or more additional updates that precede the update, or proceed the update, or both; and
providing a second representation of the GUI to the client device, wherein the second representation of the GUI comprises the update and the one or more additional updates positioned along the particular timeline.

3. A non-transitory computer-readable medium comprising computer readable instructions, that when executed by one or more processors, causes the one or more processors to perform operations comprising:
providing a first representation of a graphical user interface (GUI) to a client device, wherein the first representation of the GUI displays a timeline for each item of one or more items associated with a time-based data structure;
requesting update information associated with a portion of a particular timeline from a history walker interface configured to retrieve the update information from the time-based data structure, wherein the update information is related to an update to a particular item of the one or more items, and wherein the update is positioned along the particular timeline;
receiving the update information from the history walker interface, wherein the update information is indicative of one or more additional updates that precede the update, or proceed the update, or both; and
providing a second representation of the GUI to the client device, wherein the second representation of the GUI comprises the update and the one or more additional updates positioned along the particular timeline.

4. The system of claim 1, wherein the second representation of the GUI comprises field values for the update, or each of the one or more additional updates, or both, and indicates field value changes between the update and the one or more additional updates.

5. The system of claim 1, wherein the second representation of the GUI is configured to display a dialog box in response to a selection of a particular update of a plurality of closely occurring updates of the update and the one or more additional updates, and wherein the dialog box enables navigation of the plurality of closely occurring updates.

6. The system of claim 1, wherein the actions comprise generating the first representation of the GUI in response to receiving a selection of the time-based data structure and the update.

7. The system of claim 1, wherein the one or more items comprise tasks associated with one or more service level agreements (SLAs), and wherein the first representation of the GUI and the second representation of the GUI indicate compliance with the one or more SLAs.

8. The system of claim 1, wherein the first representation of the GUI comprises a selectable option to retrieve field value changes between the update and the one or more additional updates.

9. The system of claim 1, wherein the first representation of the GUI and the second representation of the GUI indicate whether each update of the update and the one or more additional updates are a task update or a task update with a state change, and whether each item of the one or more items is in-progress, completed, or canceled.

10. The method of claim 2, wherein the second representation of the GUI comprises field values for the update, or each of the one or more additional updates, or both, and indicates field value changes between the update and the one or more additional updates.

11. The method of claim 2, wherein the second representation of the GUI is configured to display a dialog box in response to a selection of a particular update of a plurality of closely occurring updates of the update and the one or more additional updates, and wherein the dialog box enables navigation of the plurality of closely occurring updates.

12. The method of claim 2, comprising generating the first representation of the GUI in response to receiving a selection of the time-based data structure and the update.

13. The method of claim 2, wherein the first representation of the GUI and the second representation of the GUI indicate whether each update of the update and the one or more additional updates are a task update or a task update with a state change and whether each item of the one or more items is in-progress, completed, or canceled.

14. The non-transitory computer-readable medium of claim 3, wherein the second representation of the GUI comprises field values for the update, or each of the one or more additional updates, or both, and indicates field value changes between the update and the one or more additional updates.

15. The non-transitory computer-readable medium of claim 3, wherein the second representation of the GUI is configured to display a dialog box in response to a selection of a particular update of a plurality of closely occurring updates of the update and the one or more additional updates, and wherein the dialog box enables navigation of the plurality of closely occurring updates.

16. The non-transitory computer-readable medium of claim 3, wherein the one or more items comprise tasks associated with one or more service level agreements (SLAs), and wherein the first representation of the GUI and the second representation of the GUI indicate compliance with the one or more SLAs.

17. The non-transitory computer-readable medium of claim 3, wherein the first representation of the GUI comprises a selectable option to retrieve field value changes between the update and the one or more additional updates.

18. The system of claim 7, wherein each task comprises one or more color-coded segments representing an elapsed timeline and a compliance status with the one or more SLAs.

19. The system of claim 8, wherein requesting the update information comprises requesting the field value changes in response to the selectable option being set to true.

20. The non-transitory computer-readable medium of claim 17, wherein the request for update information comprises a request for the field value changes in response to the selectable option being set to true.

\* \* \* \* \*